US009279939B2

(12) United States Patent
Onishi (10) Patent No.: US 9,279,939 B2
(45) Date of Patent: Mar. 8, 2016

(54) SPOT-SIZE CONVERTER (75) Inventor: Yutaka Onishi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 178 days.

(21) Appl. No.: 13/404,038

(22) Filed: Feb. 24, 2012

(65) Prior Publication Data
US 2012/0224820 A1 Sep. 6, 2012

(30) Foreign Application Priority Data

Mar. 2, 2011 (JP) ................................ 2011-045279

(51) Int. Cl.
G02B 6/12 (2006.01)
G02B 6/26 (2006.01)
G02B 6/42 (2006.01)
G02B 6/10 (2006.01)
G02B 6/122 (2006.01)
G02B 6/30 (2006.01)

(52) U.S. Cl.
CPC .............. *G02B 6/1228* (2013.01); *G02B 6/305* (2013.01); *G02B 6/12016* (2013.01); *G02B 6/262* (2013.01)

(58) Field of Classification Search
CPC ........ G02B 6/26; G02B 6/262; G02B 6/1228; G02B 6/12016; G02B 6/2852
USPC ............ 385/14, 28, 30, 31, 43, 126, 129–132
See application file for complete search history.

(56) References Cited

U.S. PATENT DOCUMENTS

| 2002/0118916 A1* | 8/2002 | Lee et al. ......................... 385/28 |
| 2007/0211989 A1* | 9/2007 | Blauvelt et al. ................. 385/28 |
| 2010/0040327 A1* | 2/2010 | Deki et al. ....................... 385/28 |
| 2011/0205660 A1* | 8/2011 | Komura et al. ................. 360/59 |

FOREIGN PATENT DOCUMENTS

| JP | 08-152538 | 6/1996 |
| JP | 2007-93743 | 4/2007 |
| JP | 2011/022464 | 2/2011 |
| WO | 2008/114624 A1 | 9/2008 |

OTHER PUBLICATIONS

Notification of Reasons for Rejection, Japanese Patent Application No. JP2011-045279, dispatch date, Aug. 26, 2014.

* cited by examiner

*Primary Examiner* — Kaveh Kianni
*Assistant Examiner* — Hung Lam
(74) *Attorney, Agent, or Firm* — Smith, Gambrell & Russell LLP.

(57) ABSTRACT

A spot-size converter includes a cladding layer having a principal surface; a first core layer disposed on the principal surface and having a light input/output portion and a first transition portion having a width W1, the light input/output portion being coupled to the first transition portion and having a width that monotonously decreases in a first direction from the light input/output portion toward the first transition portion; and a second core layer disposed on the principal surface, the second core layer having a second transition portion and a propagation portion coupled to the second transition portion, the second transition portion having a width W2. The first core layer has a refractive index between refractive indices of the second core layer and the cladding layer. The first transition portion and the second transition portion are disposed with a gap therebetween and optically coupled to each other. A ratio (W1/W2) of the width W1 to the width W2 monotonously decreases in the first direction.

18 Claims, 9 Drawing Sheets

SPOT-SIZE CONVERTER

BACKGROUND OF THE INVENTION

1. Field of the Invention

The present invention relates to a spot-size converter.

2. Description of the Related Art

Japanese Unexamined Patent Application Publication No. 2007-93743 (Patent Document 1) discloses an optical waveguide having a spot-size conversion region. Without using a spot-size converter such as a thermally expanded core (TEC) fiber, an optical coupling with low loss can be provided between a high Δ optical waveguide and a single-mode optical fiber (SMF), both of which have different spot sizes. The optical waveguide having a spot-size conversion region includes an optical waveguide having a waveguide core and a ridge portion disposed at the fiber-coupled-end side of the optical waveguide. The ridge portion functions as the spot-size converter. The cross section of the ridge portion has a projecting shape. Furthermore, the width and height of the ridge portion decrease in a waveguiding direction from the fiber-coupled-end side.

SUMMARY OF THE INVENTION

A silicon (Si) optical waveguide is constituted by a core layer having a high refractive index and composed of Si and a cladding layer having a low refractive index and composed of air or silicon oxide. This Si optical waveguide constitutes a so-called high Δoptical waveguide that has a large difference in refractive index between the core layer and the cladding layer. In this Si optical waveguide, the bend radius of the waveguide can be decreased to about 5 μm without generating the propagation loss of light. Furthermore, an optical circuit can be downsized.

However, when the Si optical waveguide is directly coupled to a single-mode optical fiber (SMF), the coupling efficiency between the Si optical waveguide and the single-mode optical fiber is considerably low. For example, the coupling efficiency is 10% or less. The reason why the coupling efficiency is low between the Si optical waveguide and the single-mode optical fiber is that the difference in spot size between them is large. For example, the spot size of the Si optical waveguide is about 0.5 μm whereas the spot size of the single-mode optical fiber is about 10 μm. Therefore, the mode-miss-matching is generated between the Si optical waveguide and the single-mode optical fiber, which decreases the coupling efficiency. To suppress the decrease in coupling efficiency, a spot-size converter is formed in a light input/output portion of the Si optical waveguide.

In Patent Document 1, the optical waveguide having a spot-size conversion region has a structure in which another core is formed around the waveguide core in the ridge portion. To change the shape of the modal field adiabatically, the other core formed around the waveguide core has a tapered shape. When such a structure is formed using a Si material, the waveguide core is composed of Si and the other core is composed of SiN or SiON, for example.

However, in the structure in which the waveguide core is composed of Si and the waveguide core is covered by the other core composed SiN or SiON, light guiding in the waveguide core composed of Si is strongly confined in the waveguide core. Therefore, the guided light hardly expands to a region other than the waveguide core.

On the other hand, a spot-size converter according to the present invention includes (a) a cladding layer having a principal surface; (b) a first core layer disposed on the principal surface of the cladding layer, the first core layer having a light input/output portion and a first transition portion having a width W1 arranged along a first axis, the light input/output portion extending from an end of the spot-size converter and being coupled to the first transition portion, the light input/output portion having a width that monotonously decreases in a first direction from the light input/output portion toward the first transition portion; and (c) a second core layer disposed on the principal surface of the cladding layer, the second core layer being composed of a material different from a material of the first core layer, the second core layer having a second transition portion extending along a second axis and a propagation portion coupled to the second transition portion, the second transition portion having a width W2, the second axis extending along the first axis. The first core layer has a refractive index between a refractive index of the second core layer and a refractive index of the cladding layer. The first transition portion and the second transition portion are disposed with a gap therebetween and the first transition portion is optically coupled to the second transition portion. The first core layer has a thickness different from a thickness of the second core layer. In addition, a ratio (W1/W2) of the width W1 to the width W2 monotonously decreases in the first direction.

According to this spot-size converter, the core width ratio (W1/W2) monotonously decreases in the first direction from the light input/output portion toward the first transition portion. Furthermore, the first core layer has a refractive index between the refractive index of the second core layer and the refractive index of the cladding layer. Thus, the second transition portion has a refractive index higher than that of the first transition portion. Therefore, optical confinement in the first transition portion or the second transition portion changes in the first direction. As a result, the degree of an optical coupling between the second transition portion and the first transition portion monotonously changes in the first direction. Specifically, the degree of the optical coupling between the second transition portion and the first transition portion monotonously increases in the first direction. Therefore, the transition of guided light can be caused from one of the first and second core layers to the other. Furthermore, the width of the light input/output portion monotonously decreases in the first direction while the thickness of the first core layer is different from the thickness of the second core layer. Thus, the spot size can be converted regardless of the material of the second core layer and the width and thickness of the second core layer.

In the spot-size converter according to the present invention, the first core layer may be terminated at a position away from the end of the spot-size converter, and the second core layer may be terminated at a position away from the end of the spot-size converter.

In the spot-size converter according to the present invention, the width W2 of the second transition portion preferably monotonously increases in the first direction.

According to this spot-size converter, the width W2 of the second transition portion monotonously increases in the first direction. In this case, the optical confinement of light in the second transition portion decreases in a second direction that is opposite to the first direction. As a result, the modal field of light in the second transition portion expands in the second direction. Therefore, for example, when light in the first core layer is guided in the first direction, the transition of light is caused from the first core layer to the second core layer. Then, the optical amplitude in the second core layer increases because the light is affected by the expansion of the modal field in the second core layer. Alternatively, for example, when light in the second core layer is guided in the second direction, the transition of light is caused from the second core layer to the first core layer. Then, the optical amplitude in the first core layer increases because the light is affected by the expansion of the modal field in the second core layer.

In the spot-size converter according to the present invention, the gap between the first transition portion and the second transition portion may be 150 nm or more and 240 nm or less. According to this spot-size converter, the transition of light from one of the first and second core layers to the other can be caused with high efficiency at least in the above-described range of the gap.

The spot-size converter according to the present invention may further include an over-cladding layer disposed on the principal surface of the cladding layer, the first core layer and the second core layer, the over-cladding layer covering the first core layer and the second core layer. The over-cladding layer is preferably disposed between the first transition portion and the second transition portion. According to this spot-size converter, the coupling between the first transition portion and the second transition portion and the degree of expansion of the modal field are adjusted by controlling the refractive index of the over-cladding layer disposed between the first transition portion and the second transition portion.

In the spot-size converter according to the present invention, the width W1 of the first transition portion preferably monotonously decreases in the first direction. According to this spot-size converter, the width W1 of the first transition portion monotonously decrease in the first direction. Then, the expansion of the modal field of light guiding in the first transition portion of the first core layer increases in the second direction that is opposite to the first direction.

In the spot-size converter according to the present invention, the width W1 of the first transition portion may be constant in the first direction. According to this spot-size converter, the ratio (W1/W2) of the width W1 of the first transition portion to the width W2 of the second transition portion monotonously decreases in the first direction while the width W1 of the first transition portion is constant in the first direction. Consequently, the expansion of the modal field of light guiding in the second transition portion of the second core layer increases in the second direction. Thus, the shape of the modal field in the second transition portion is changed adiabatically. This realizes highly efficient spot-size conversion.

In the spot-size converter according to the present invention, the gap between the first transition portion and the second transition portion may monotonously decrease in the first direction. According to this spot-size converter, when the gap between the first transition portion and the second transition portion monotonously decreases in the first direction, the modal field of the first transition portion expands so as to overlap the second transition portion.

In the spot-size converter according to the present invention, the first core layer may further have a first curved waveguide portion that is curved on the principal surface of the cladding layer; the first core layer may be terminated at a position away from the end of the spot-size converter; the first curved waveguide portion may be coupled to one end of the first transition portion; and the light input/output portion may be coupled to another end of the first transition portion. According to this spot-size converter, the first curved waveguide portion can reduce the reflection at the terminal of the first core layer.

In the spot-size converter according to the present invention, the second core layer may further have a second curved waveguide portion that is curved on the principal surface of the cladding layer; the second core layer may be terminated at a position away from the end of the spot-size converter; the second curved waveguide portion may be coupled to one end of the second transition portion; and the propagation portion may be coupled to another end of the second transition portion. According to this spot-size converter, the second curved waveguide portion can reduce the reflection at the terminal of the second core layer.

In the spot-size converter according to the present invention, the first core layer may be composed of at least one of silicon nitride, silicon oxynitride, titanium oxide, and aluminum oxide; the second core layer may be composed of silicon; and the thickness of the first core layer may be larger than the thickness of the second core layer.

In the spot-size converter according to the present invention, the first core layer may be composed of a polymer; the polymer may have a refractive index between the refractive index of the second core layer and the refractive index of the cladding layer; the second core layer may be composed of silicon; and the thickness of the first core layer may be larger than the thickness of the second core layer. Furthermore, the polymer constituting the first core layer may contain a benzocyclobutene resin, a polyimide resin, or an epoxy resin. In addition, the cladding layer may be composed of silicon oxide.

DESCRIPTION OF THE PREFERRED EMBODIMENTS

The findings of the present invention can be easily understood by considering the detailed description below with reference to the attached drawings shown as examples. Embodiments of spot-size converters according to the present invention will now be described with reference to the attached drawings. If possible, the same components are denoted by the same reference numerals.

Figure 1A:
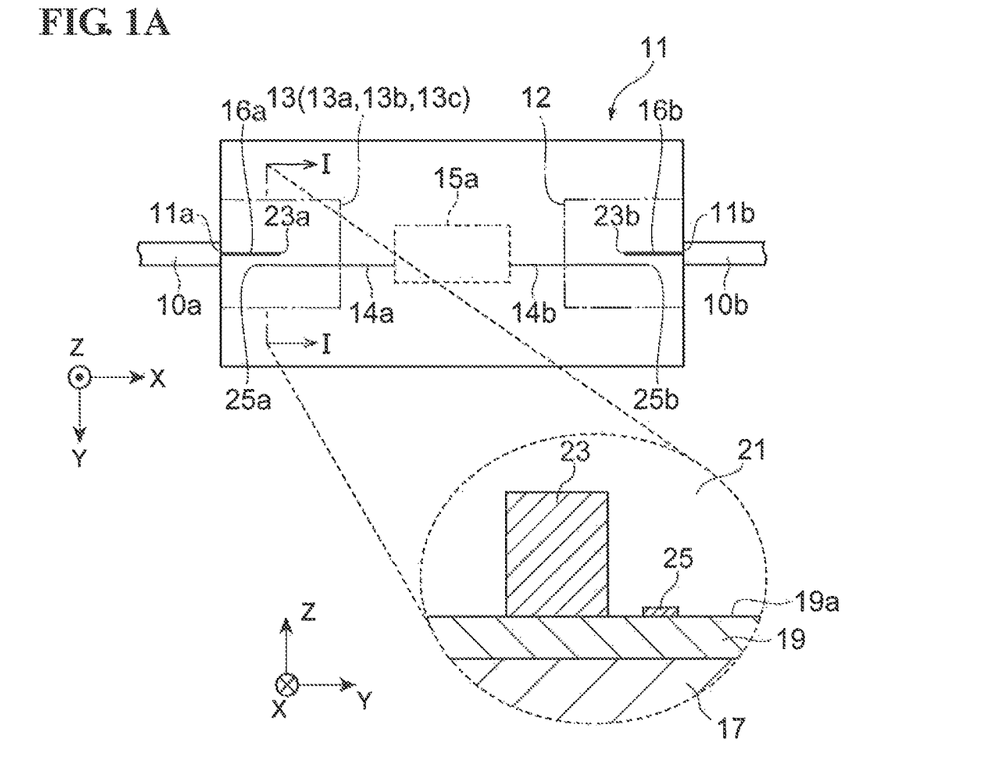
FIG. 1A schematically shows an optical device having a spot-size converter according to a first embodiment.
Figure 1B:
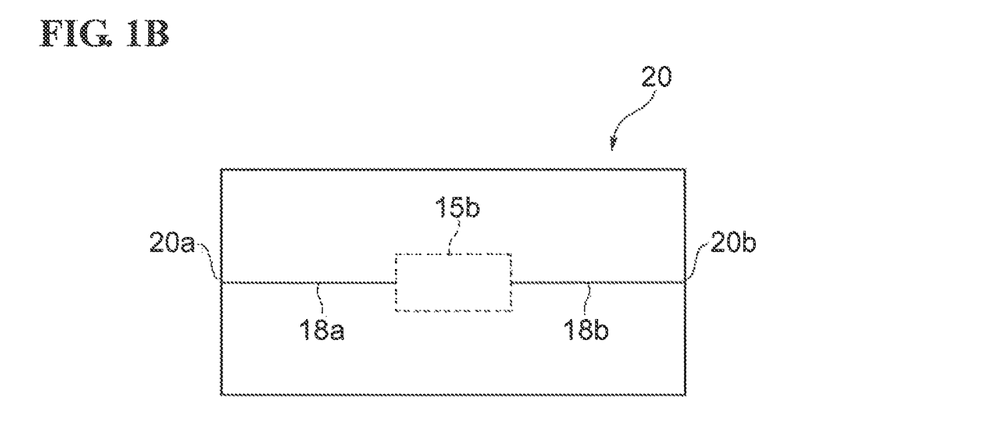
FIG. 1B schematically shows an optical device without a spot-size converter.

FIGS. 1A and 1B schematically show an optical device. FIG. 1A schematically shows an optical device 11 according to this embodiment. The optical device 11 includes a waveguide end 11a and a waveguide end 11b. Waveguide devices such as optical fibers 10a and 10b are optically coupled to the waveguide ends 11a and 11b, respectively. The optical device 11 is, for example, butt-coupled to the waveguide devices. The optical device 11 includes a spot-size converter 13 and a light processing unit 15a. The spot-size converter 13 is disposed on the waveguide end 11a. The light processing unit 15a is optically coupled to the spot-size converter 13 through a waveguide 14a. The optical device 11 also includes another spot-size converter 12 that is optically coupled to the light processing unit 15a through a waveguide 14b. The spot-size converter 12 is disposed on the waveguide end 11b. Waveguides 16a and 16b are coupled to the waveguide ends 11a and 11b, respectively. The optical device 11 receives guided light from one of the optical fibers 10a and 10b and transmits the guided light to the other. The light processing unit 15a includes optical devices such as an optical modulator, an optical attenuator, and a wavelength filter.

FIG. 1B schematically shows another optical device that does not include spot-size converters. An optical device 20 includes a light processing unit 15b. The light processing unit 15b is coupled to a waveguide 18a that extends directly from a waveguide end 20a and a waveguide 18b that extends directly from a waveguide end 20b.

FIG. 1A also shows a sectional view taken along line I-I in the spot-size converter 13 of the optical device 11. The optical device 11 includes a substrate 17 and a cladding layer 19 disposed on the substrate 17. A first core layer 23 and a second core layer 25 are disposed on a principal surface 19a of the cladding layer 19 so that they are separated in the Y direction by a separation S. The cladding layer 19 is composed of, for example, a dielectric material such as $SiO_2$. Its principle surface 19a defines an X-Y plane extends through each of first core layer 23, second core layer 25, and separation S between them. The waveguide 14a includes the second core layer 25 and the waveguide 14b includes the second core layer 25. The waveguide 16a includes the first core layer 23 and the waveguide 16b includes the first core layer 23. The thickness of the first core layer 23 is larger than that of the second core layer 25, and thus spot-size conversion is easily performed. The second core layer 25 is composed of silicon and the first core layer 23 is composed of a material different from silicon. The first core layer 23 has a refractive index whose value is between the refractive index of the second core layer 25 and the refractive index of the cladding layer 19. The optical device 11 includes an over-cladding layer 21. The over-cladding layer 21 is disposed on the cladding layer 19 so as to cover the first core layer 23 and the second core layer 25.

First Embodiment

Figure 2:
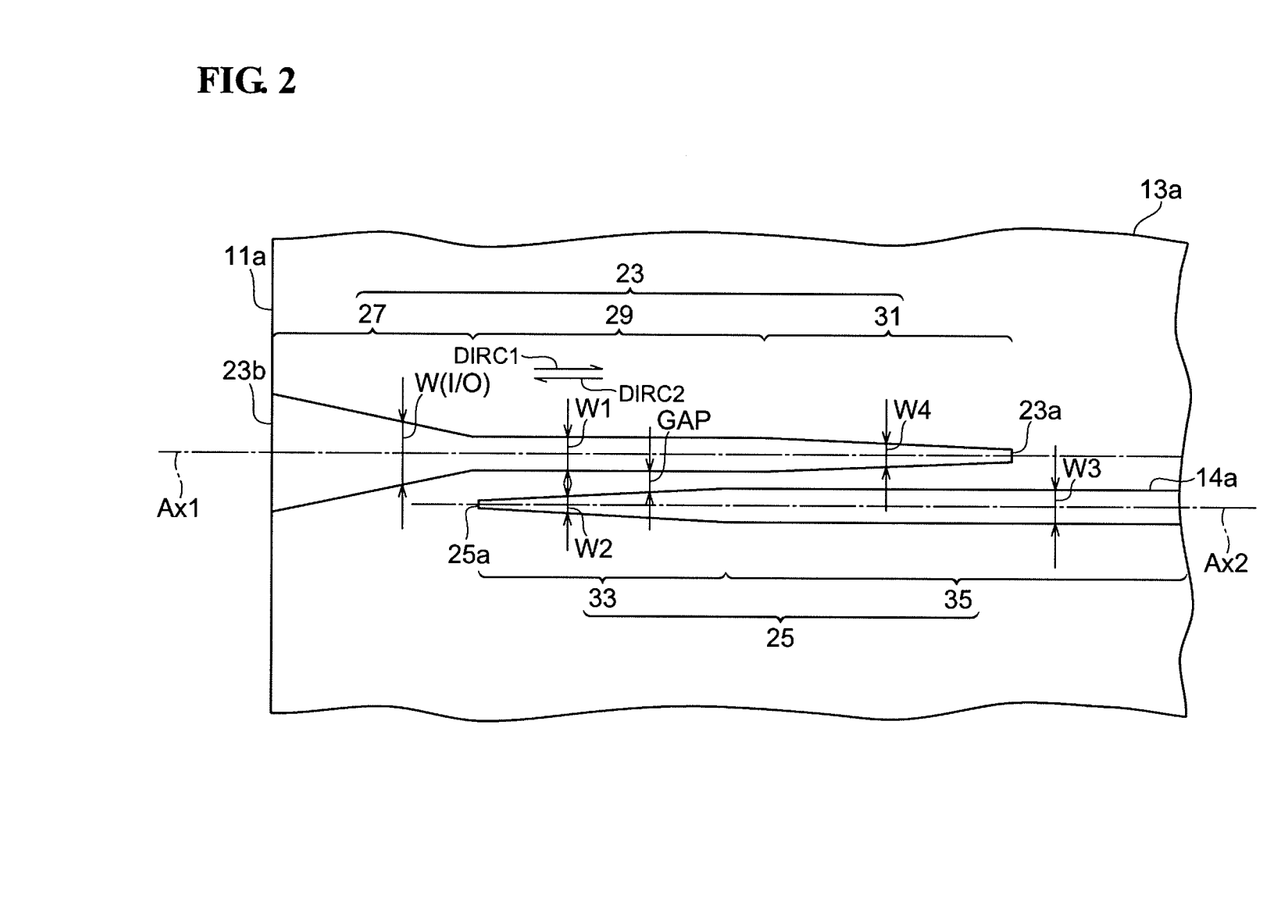
FIG. 2 schematically shows a spot-size converter according to a first embodiment.

FIG. 2 schematically shows a spot-size converter according to this embodiment. In a spot-size converter 13a, the first core layer 23 has a light input/output portion 27 and a first transition portion 29. The light input/output portion 27 and the first transition portion 29 are disposed in order along a first axis Ax1. The second core layer 25 has a second transition portion 33 and a propagation portion 35. The second transition portion 33 extends along a second axis Ax2 and the propagation portion 35 is coupled to the second transition portion 33. The width W3 of the propagation portion 35 is substantially constant. The second axis Ax2 extends along the first axis Ax1. In a preferred embodiment, the second axis Ax2 is parallel to the first axis Ax1.

The light input/output portion 27 extends from the end 11a of the spot-size converter 13a and is optically coupled to the first transition portion 29. The first core layer 23 has one end 23a and another end 23b. The one end 23a is terminated at a position away from the end 11a of the spot-size converter 13a. The other end 23b is located at the end 11a of the spot-size converter 13a. The second core layer 25 has one end 25a and another end 25b (another end 25b is shown in FIG. 1A). The one end 25a is terminated at a position away from the end 11a of the spot-size converter 13a. The light input/output portion 27 has a width W(I/O) that monotonously increases in a second direction DIRC2 from the first transition portion 29 toward the light input/output portion 27. In other words, The light input/output portion 27 has the width W(I/O) that monotonously decreases in a first direction DIRC1 that is opposite to the second direction DIRC2.

The first transition portion 29 and the second transition portion 33 are disposed so as to have a gap GAP therebetween. The first transition portion 29 is optically coupled to the second transition portion 33. The ratio (W1/W2) of the width W1 of the first transition portion 29 to the width W2 of the second transition portion 33 monotonously decreases in the first direction DIRC1 from the light input/output portion 27 toward the first transition portion 29.

According to this spot-size converter 13a, when the core width ratio (W1/W2) monotonously decreases in the direction DIRC1 from the light input/output portion 27 toward the first transition portion 29, the degree of an optical coupling between the second transition portion 33 and the first transition portion 29 gradually changes in the direction DIRC2. Therefore, guided light transfers from one of the first and second core layers 23 and 25 to the other. The width W(I/O) of the light input/output portion 27 monotonously increases in the direction DIRC2 from the first transition portion 29 toward the light input/output portion 27, and the thickness of the first core layer 23 is larger than that of the second core layer 25. This structure realizes spot-size conversion, regardless of the material of the second core layer 25 and the width and thickness of the second core layer 25.

In the spot-size converter 13a, the first transition portion 29 of the first core layer 23 and the second transition portion 33 of the second core layer 25 are disposed so as to constitute a directional coupler.

An embodiment of the spot-size converter 13a will be described with reference to FIG. 2. In the spot-size converter 13a, the width W2 of the second transition portion 33 preferably monotonously increases in the direction DIRC1 from the light input/output portion 27 toward the first transition portion 29. The first transition portion 29 has, for example, a substantially constant width. According to this spot-size converter 13a, the second transition portion 33 has a refractive index higher than that of the first transition portion 29, and the width W2 of the second transition portion 33 monotonously increases in the direction DIRC1. As a result, the modal field of light guiding in the second transition portion 33 expands in the direction DIRC1. Therefore, light guiding in the first core layer 23 in the direction DIRC1 transfers from the first core layer 23 to the second core layer 25. Then, the optical amplitude in the second core layer 25 increases in the direction DIRC1 because of the expansion of the modal field in the second core layer 25. Furthermore, light guiding in the second core layer 25 in the direction DIRC2 transfers from the second core layer 25 to the first core layer 23. Then, the optical amplitude in the first core layer 23 increases in the direction DIRC2 because of the expansion of the modal field in the second core layer 25 and an overlapping optical field between the first core layer 23 and the second core layer 25.

Since the second transition portion 33 is composed of silicon, the light guiding in the second core layer 25 is strongly confined in the second transition portion 33. Therefore, the modal field of guided light does not significantly expand into a cladding layer. The width W2 of the second transition portion 33 gradually decreases in the direction DIRC2. In this case, the optical modal field in the second transition portion 33 tends to expand to a region outside the core layer rather than being confined in the core layer. When the second core layer 25 having the second transition portion 33 is composed of silicon, a difference in refractive indices between the second core layer 25 and the cladding layer is large. Therefore, the guided light is strongly confined in the second core layer 25. However, because of the decrease in the core width, the light guiding in the second core layer 25 expands into the cladding layer located outside the second core layer 25. This allows the transition of light to the first transition portion 29.

The first core layer 23 further includes a reflection controlling portion 31. The width W4 of the reflection controlling portion 31 preferably monotonously decreases in the direction DIRC1 from the light input/output portion 27 to the first transition portion 29. When a width of the first core layer 23 gradually becomes narrow at one end of the first core layer 23, the shape of the modal field is changed adiabatically. As a result, the spot size is suitably converted into a small spot size. The tip of the reflection controlling portion 31 has a size that can be resolved by photolithography.

In the spot-size converter 13a, the gap GAP between the first transition portion 29 and the second transition portion 33 monotonously decreases in the direction DIRC1 from the light input/output portion 27 toward the first transition portion 29. When the gap GAP between the first transition portion 29 and the second transition portion 33 gradually decreases in the direction DIRC1, the degree of the optical coupling between the propagation mode in the first transition portion 29 and the propagation mode in the second transition portion 33 gradually increases in the direction DIRC1.

In the spot-size converter 13a, the over-cladding layer 21 is disposed on a principal surface of the cladding layer 19, the first core layer 23 and the second core layer 25. The over-cladding layer 21 covers the first core layer 23 and the second core layer 25. The over-cladding layer 21 is disposed between the first transition portion 29 and the second transition portion 33. By adjusting the refractive index of the over-cladding layer 21 disposed between the first transition portion 29 and the second transition portion 33, the ratio of the optical coupling between the first transition portion 29 and the second transition portion 33 is controlled.

The gap GAP between the first transition portion 29 and the second transition portion 33 is, for example, 150 nm or more and 240 nm or less. When the gap GAP between the first transition portion 29 and the second transition portion 33 is within the above range, the mode transition from one of the first and second core layers 23 and 25 to the other is obtained with high efficiency or low optical loss.

The width of the first core layer 23 continuously changes at a coupling portion between the light input/output portion 27 and the first transition portion 29. The width of the first core layer 23 also continuously changes at a coupling portion between the first transition portion 29 and the reflection controlling portion 31. The width of the second core layer 25 continuously changes at a coupling portion between the second transition portion 33 and the propagation portion 35.

EXAMPLE 1

First, a straight-line waveguide is formed on a silicon-on-insulator (SOI) substrate. The SOI substrate includes a Si substrate, a lower cladding layer (called "buried oxide (BOX) layer") formed on the Si substrate and composed of silicon oxide ($SiO_2$), and a Si core layer composed of Si. The Si core layer is formed on the BOX layer. The lower cladding layer has a thickness of, for example, 2 μm and the Si core layer has a thickness of, for example, 220 nm. A method for producing an optical waveguide device will now be described. A resist is applied onto the Si core layer, and then a resist mask having a pattern is formed by photolithography. The Si core layer is etched by a dry etching process using the resist mask to form a Si core layer having a predetermined pattern. The patterned Si core layer is the second core layer in this embodiment. A SiN film to be a SiN core layer is formed on the Si core layer and the lower cladding layer. The SiN film has a thickness of, for example, 3 μm. A resist is applied onto the SiN film, and then a resist mask having a pattern is formed by photolithography. The SiN film is etched by a dry etching process using the resist mask to form a SiN core layer having a predetermined pattern. The SiN core layer composed of SiN is the first core layer in this embodiment. After the Si core layer and the SiN core layer are formed, an over-cladding layer composed of silicon oxide ($SiO_2$) is formed on the lower cladding layer, the Si core layer and the SiN core layer. The over-cladding layer covers the Si core layer and the SiN core layer. The over-cladding layer has a thickness of, for example, 5 μm.

An example of the spot-size converter 13a is shown below.
First core layer 23: SiN, 3 μm in thickness
Second core layer 25: Si, 220 nm in thickness
Length of light input/output portion 27: 300 μm
Width of light input/output portion 27 (end surface): 3 μm
Length of first transition portion 29: 450μm
Width of first transition portion 29: 800 nm
Length of reflection controlling portion 31: 300 μm
Width of tip of reflection controlling portion 31: 200 nm
Length of second transition portion 33: 440 μm
Width of tip of second transition portion 33: 180 nm
Width of propagation portion 35: 450 nm
Gap between first transition portion 29 and second transition portion 33: 150 nm (minimum) and 240 nm (maximum)

In Example 1, the light input/output portion 27, the reflection controlling portion 31, and the transition portion 33 each have a tapered shape.

The SiN core layer in the reflection controlling portion 31 has a tapered shape in which the width of the SiN core layer increases in a transverse direction as the distance from the transition portion 29 decreases. In the SiN core layer, the sectional shape of a waveguide core continuously changes from a quadrilateral having a width of 200 nm and a height of 3 μm to a quadrilateral having a width of 800 nm and a height of 3 μm. Since the sectional shape of the reflection controlling portion 31 changes in a tapered manner, the reflection of light guiding in the Si core layer at the end surface of the SiN core layer is reduced. The SiN core layer in the transition portion 29 has a width of 800 nm and a height of 3 μm. A part of the transition portion 29 on one end has a constant width, and the part of the transition portion 29 and the propagation portion 35 of the Si core layer are in parallel with each other. The length of the part is, for example, about 10 μm. The gap between the part of the SiN core layer and the propagation portion 35 of the Si core layer is, for example, 150 nm. The part of the transition portion 29 on one end is coupled to the reflection controlling portion 31.

Figure 3:
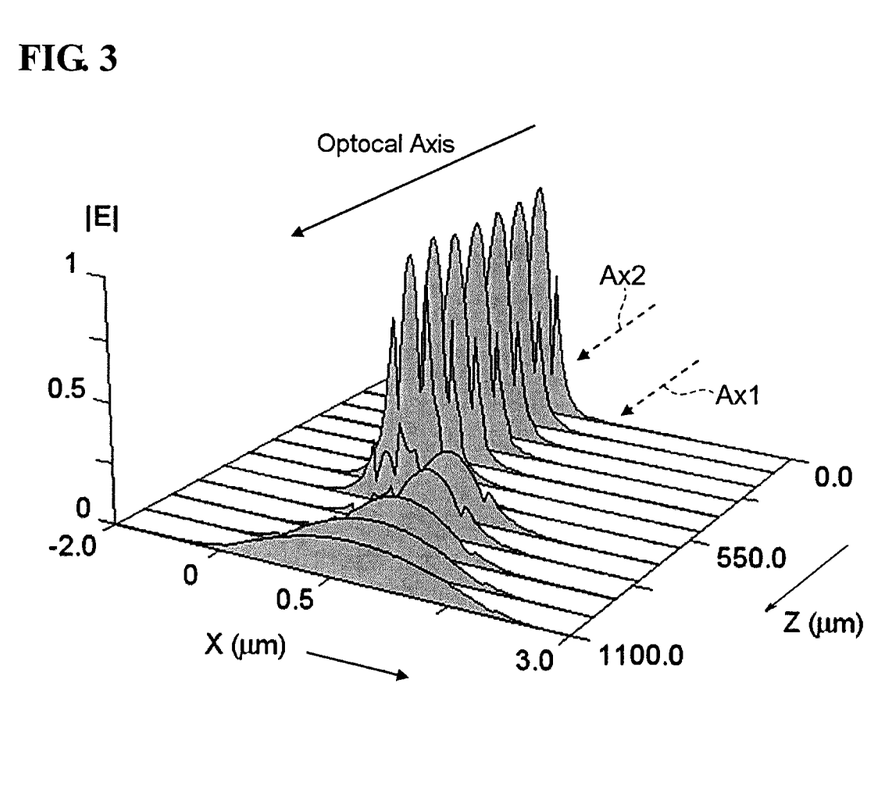
FIG. 3 shows a light intensity distribution in a spot-size converter having a gap of 150 nm.

The light intensity distribution in the spot-size converter having the above-described structure was calculated. The wavelength of guided light was 1550 nm. FIG. 3 shows a light intensity distribution in a spot-size converter having a gap of 150 nm.

A waveguide mode that propagates in the Si core layer (which is indicated by the second axis Ax2 in FIG. 3) is shifted to the SiN core layer (which is indicated by the first axis Ax1 in FIG. 3) in the transition portion and is completely converted, at the SiN waveguide end, into a waveguide mode that propagates in the SiN core layer. As a result of the evaluation of the optical coupling efficiency between the spot-size converter and a single-mode silica fiber, the optical coupling efficiency was 69%, which was a significantly improved result. Herein, the modal field diameter of the single-mode silica fiber is, for example, 10 μm. Even if the length of the transition portion is changed from 250 μm to 600 μm with a gap of 150 nm, the optical coupling efficiency between the spot-size converter and the single-mode silica fiber was found to be in the range of 65 to 69%. This means that the acceptable range for the length of the transition portion is significantly wide. When one end of the Si core layer has a tapered shape, guided light sufficiently expands into the cladding layer and the modal field is expanded. Consequently, the mode in the Si core layer and the mode in the SiN core layer are easily coupled to each other.

Figure 4:
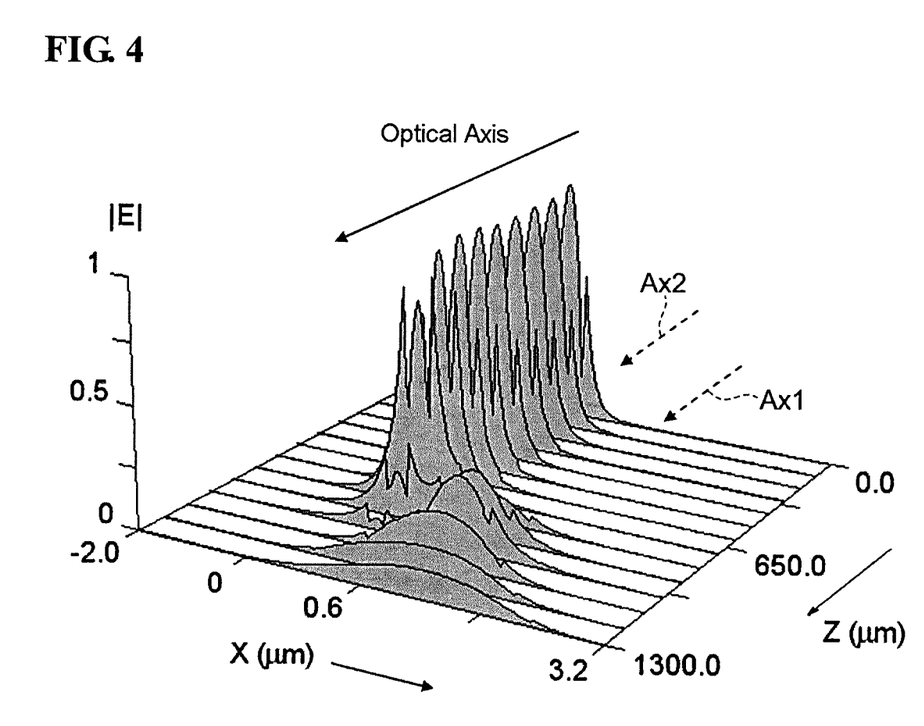
FIG. 4 shows a light intensity distribution in a spot-size converter having a gap of 300 nm.

FIG. 4 shows a light intensity distribution in a spot-size converter having a gap of 300 nm. The length of the transition portion of the SiN core layer is 450 nm. As in the result shown in FIG. 3, a waveguide mode that propagates in the Si core layer is shifted to the SiN core layer in the transition portion. As shown in FIG. 4, in the propagation mode, light intensity periodically changes in a transverse direction inside the SiN core layer. This means that a higher mode is excited compared with the propagation mode in FIG. 3. In this case, the optical coupling efficiency between the spot-size converter and a single-mode silica fiber (SMF) is 49%.

Subsequently, the calculation results of the gap dependence of the optical coupling efficiency between the spot-size converter and a SMF are shown. When the gap is 240 nm or less, the optical coupling efficiency is 60% or more. From the results of FIGS. 3 and 4, the gap is preferably 150 nm or more and 240 nm or less. As shown in FIGS. 3 and 4, light is strongly confined in the propagation portion of the Si core layer.

Second Embodiment

Figure 5:
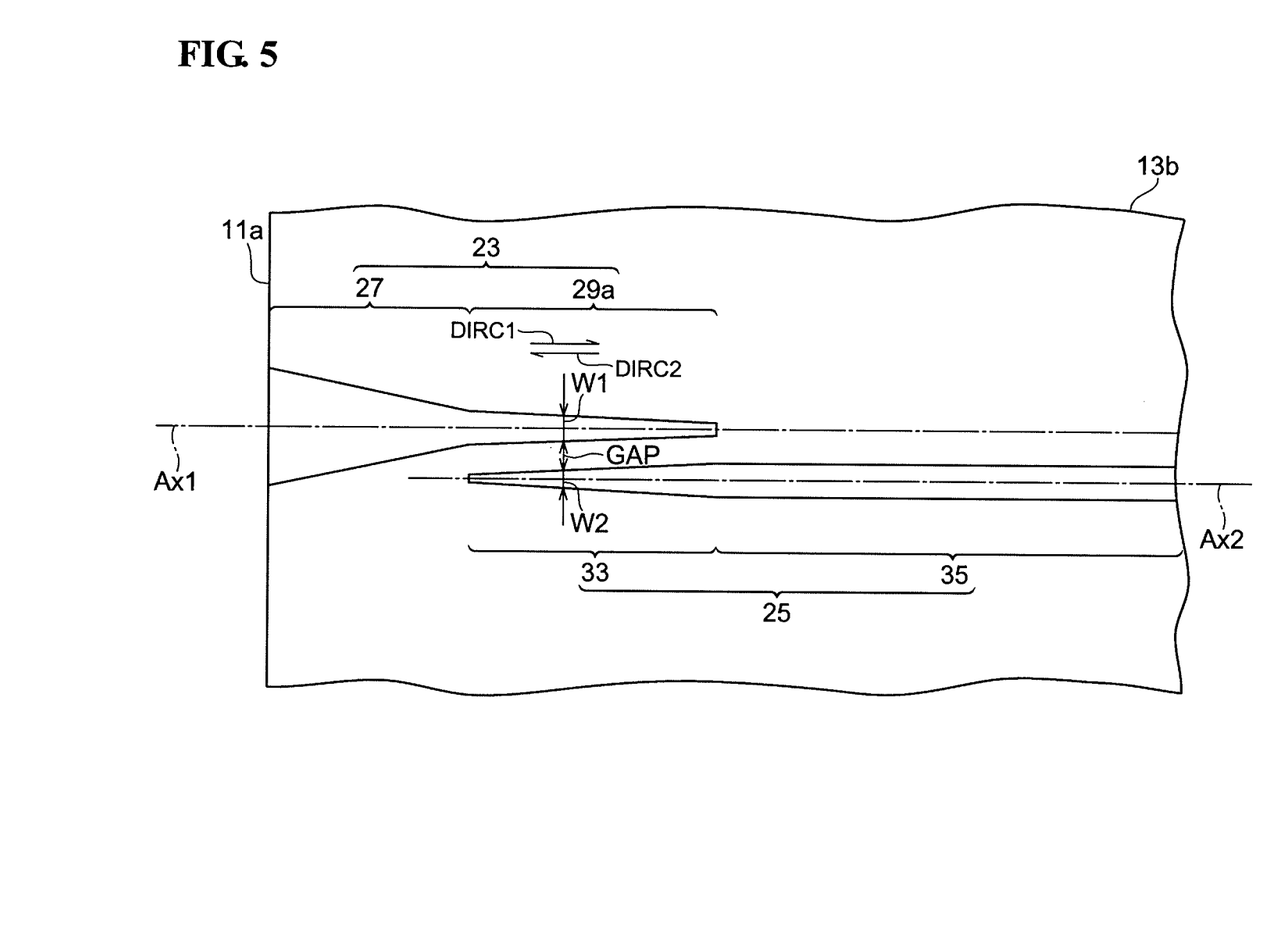
FIG. 5 schematically shows a spot-size converter according to a second embodiment.

FIG. 5 schematically shows a spot-size converter according to this embodiment. A spot-size converter 13*b* includes a first transition portion 29*a* instead of the first transition portion 29 of the spot-size converter 13*a*. The width W1 of the first transition portion 29*a* monotonously decreases in the direction DIRC1 from the light input/output portion 27 toward the first transition portion 29*a*. The confinement of light guiding in the first transition portion 29*a* of the first core layer 23 becomes stronger in the direction DIRC2. As described above, the width W2 of the second transition portion 33 monotonously decreases in the direction DIRC2 from the first transition portion 29*a* toward the light input/output portion 27.

According to the spot-size converter 13*b*, the core width ratio (W1/W2) gradually decreases in the direction DIRC1 from the light input/output portion 27 toward the first transition portion 29*a*. Thus, the degree of the optical coupling between the second transition portion 33 and the first transition portion 29*a* gradually changes in the direction DIRC2 or DIRC1. Therefore, the transition of guided light (waveguide mode) is caused from one of the first and second core layers 23 and 25 to the other. Furthermore, the width of the light input/output portion 27 monotonously increases in the direction DIRC2 from the first transition portion 29*a* toward the light input/output portion 27, and the thickness of the first core layer 23 is larger than that of the second core layer 25. By employing such a structure, the material of the second core layer 25 and the width and thickness of the second core layer 25 is each independently designed in order to perform spot-size conversion.

Since the width W1 of the first transition portion 29*a* and the width W2 of the second transition portion 33 each continuously change, the ratio (W1/W2) monotonously increases in the direction DIRC2.

When the width W1 of the first transition portion 29*a* monotonously increases in the direction DIRC2, the amplitude of the guided light mode gradually increases in the direction DIRC2 in the first transition portion 29*a* of the first core layer 23. When the width W2 of the second transition portion 33 monotonously decreases in the direction DIRC2 from the first transition portion 29*a* toward the light input/output portion 27, the guided light mode gradually expands in the direction DIRC2 in the second transition portion 33 of the second core layer 25. In the spot-size converter 13*b*, such an increase in the amplitude of the guided light mode in the first transition portion 29*a* and such an expansion of the guided light mode in the second transition portion 33 facilitate the transition of a waveguide mode from one of the first and second transition portions 29*a* and 33 to the other.

When the width W1 of the first transition portion 29*a* gradually decreases in the direction DIRC1, the modal field of light guiding in the first transition portion 29*a* is changed adiabatically. As a result, the spot size of the first transition portion 29*a* is also changed. When the width W2 of the second transition portion 33 gradually decreases in the direction DIRC2, the modal field of light guiding in the second transition portion 33 is changed adiabatically. As a result, the spot size of light guiding in the second transition portion 33 is also changed. In this embodiment, the first transition portion 29*a* has a tapered shape and is terminated at the sharp edge of a tapered portion. With such a tapered portion whose width continuously decreases, the modal field of light guiding in the first transition portion 29*a* is changed adiabatically and the spot size is also changed. The second transition portion 33 has a tapered shape and is terminated at the sharp edge of a tapered portion. With such a tapered portion whose width continuously decreases, the modal field of light guiding in the second transition portion 33 is changed adiabatically and the spot size is also changed. The adiabatic change of the modal field of guided light reduces the reflection at the end of the waveguide.

In the spot-size converter 13*b*, the gap GAP between the first transition portion 29*a* and the second transition portion 33 is preferably substantially constant in the direction DIRC2. Also in this configuration, when the gap GAP between the first transition portion 29*a* and the second transition portion 33 is 150 nm or more and 240 nm or less, the mode transition from one of the first and second core layers 23 and 25 to the other is caused with high efficiency and low optical loss.

EXAMPLE 2

The width of the transition portion 29*a* of the SiN core layer is tapered and the width of the transition portion 33 of the Si core layer is tapered. With this structure, the length of the transition portions can be decreased to about 200 μm without increasing the optical coupling loss while a high mode transition efficiency is maintained.

Since both core layers have a tapered shape in Example 2, the gap is kept constant, for example, at 150 nm. Consequently, the mode transition between the SiN core layer and the Si core layer is performed with high efficiency.

Third Embodiment

Figure 6:
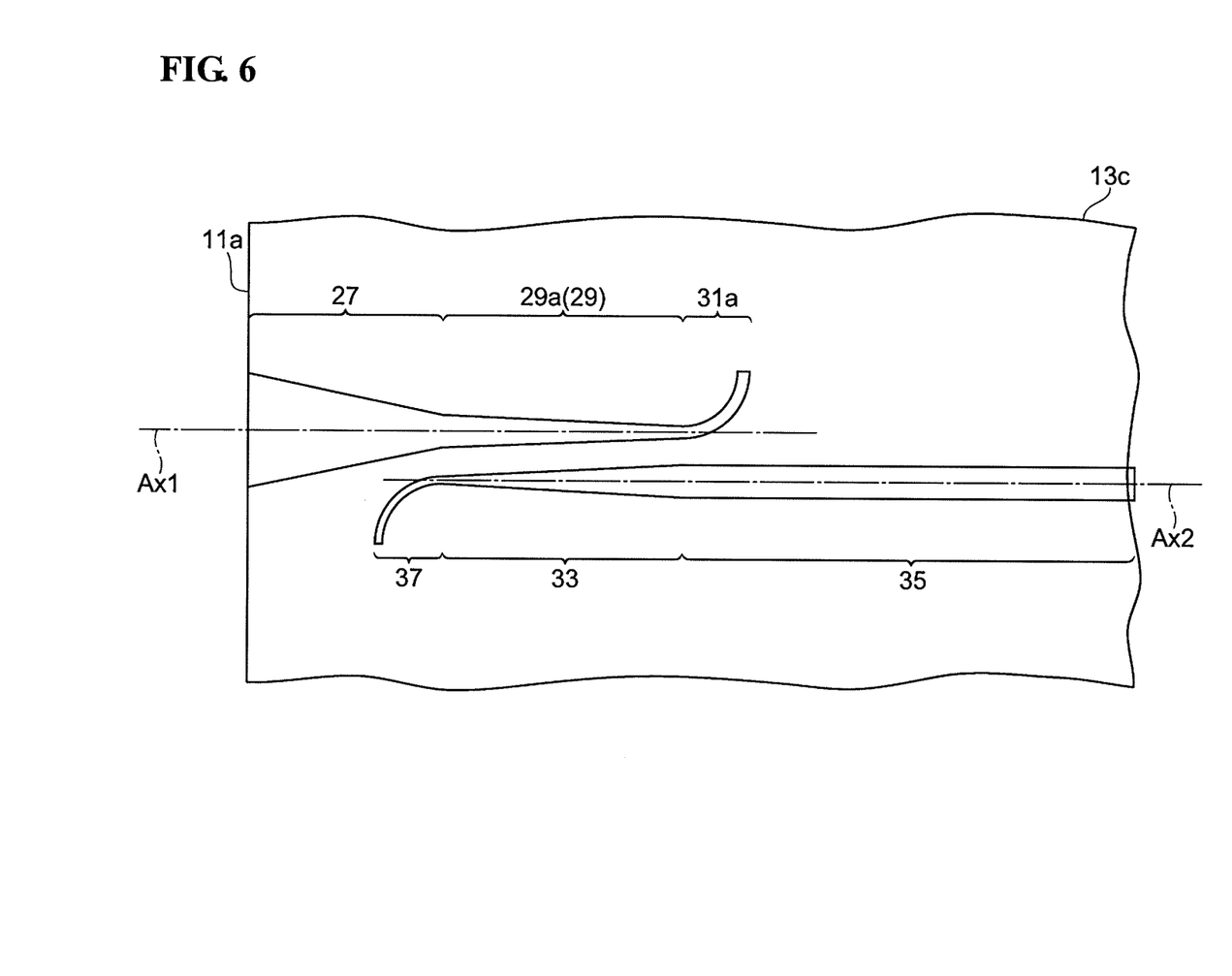
FIG. 6 schematically shows a spot-size converter according to a third embodiment.

FIG. 6 schematically shows a spot-size converter according to this embodiment. In a spot-size converter 13*c*, the first core layer 23 further has a first curved waveguide portion 31*a* that is curved on a principal surface of the cladding layer 19. The first curved waveguide portion 31*a* is coupled to one end of the first transition portion 29*a* (or the first transition portion 29 without the reflection controlling portion 31). The light input/output portion 27 is coupled to another end of the first transition portion 29a. According to this spot-size converter 13c, the first curved waveguide portion 31a reduces the reflection at the end of the first core layer 23.

The second core layer 25 further has a second curved waveguide portion 37 that is curved on a principal surface of the cladding layer 19. The second curved waveguide portion 37 is coupled to one end of the second transition portion 33. The propagation portion 35 is coupled to another end of the second transition portion 33. According to the spot-size converter 13c, the second curved waveguide portion 37 reduces the reflection at the end of the second core layer 25. The radii of curvature of the first and second curved waveguide portions 31a and 37 are, for example, 3 μm or more and 50 μm or less.

EXAMPLE 3

In a spot-size converter in which a curved waveguide is provided at one end of the first transition portion 29a and another curved waveguide is provided at one end of the second transition portion 33, the optical coupling efficiency between the spot-size converter and a SMF is 72%. The optical coupling efficiency is improved because a change in the equivalent refractive index of the waveguide adjacent to the first and second transition portions, 29a, 33 is adiabatic and thus the reflection of light is suppressed. The radii of curvature of the curved waveguides are, for example, 10 μm.

In the spot-size converters 13a, 13b, and 13c of the above-described embodiments, the first core layer 23 is composed of a dielectric material and contains at least one of silicon nitride, silicon oxynitride, titanium oxide, and aluminum oxide. In the spot-size converters 13a, 13b, and 13c, the first core layer 23 may contain at least a polymer. The polymer has the refractive index between the refractive index of the second core layer 25 and the refractive indices of the cladding layers 19 and 21. The polymer is composed of a material having a refractive index that is higher than that of the cladding layer and lower than that of the Si core layer. For example, the polymer is composed of a benzocyclobutene (BCB) resin, a polyimide resin, or an epoxy resin.

The width of the first core layer (e.g., SiN core layer) 23 is, for example, 400 nm or more and 5 μm or less. The height of the first core layer 23 is desirably 400 nm or more. This increases the spot size in the first core layer 23 compared with the spot size in the Si core layer.

The sectional shape of the end of the first core layer (e.g., SiN core layer) 23 on the light input/output portion 27 side is, for example, a rectangle. The sectional shape of the end of the first core layer (e.g., SiN core layer) 23 on the light input/output portion 27 side is preferably a square. Thus, the shape of the modal field of guided light is brought to be a round shape that is the same as the shape of the modal field of an optical fiber (SMF). As a result, the optical coupling efficiency between the spot-size converter and the SMF can be increased. To further increase the optical coupling efficiency, the aspect ratio of the sectional shape of the end of the first core layer 23 on the light input/output portion 27 side is desirably width:length=3:1 to 1:1.

The width of the transition portion 33 of the second core layer (e.g., Si core layer) 25 is desirably smaller than that of the propagation portion 35 of the second core layer (Si core layer) 25. This expands a modal field of the second core layer composed of Si, and the high coupling efficiency between the second core layer 25 and the first core layer 23 composed of SiN is easily achieved.

COMPARATIVE EXAMPLE 1

In Japanese Unexamined Patent Application Publication No. 2007-93743 (Patent Document 1), a tapered peripheral core is formed around a center core in order to expand the modal field adiabatically and increase the spot size. For example, in the case of a waveguide formed on a Si substrate, the center core is composed of Si and the peripheral core is composed of SiN or SiON. In this combination of the materials, the mode of light strongly confined in the center core hardly expands into the peripheral core (SiN or SiON) around the center core. Therefore, the coupling efficiency between the spot-size converter and a SMF is about 25%. In addition, a reflection of about 1 dB occurs at the end surface of the waveguide. Thus, even if the structure of Patent Document 1 is applied to the waveguide formed on a Si substrate, high conversion efficiency of a spot size cannot be expected because the waveguide formed on a Si substrate has a significantly large difference in refractive index between the cladding layer and the core layer.

COMPARATIVE EXAMPLE 2

Figure 7:
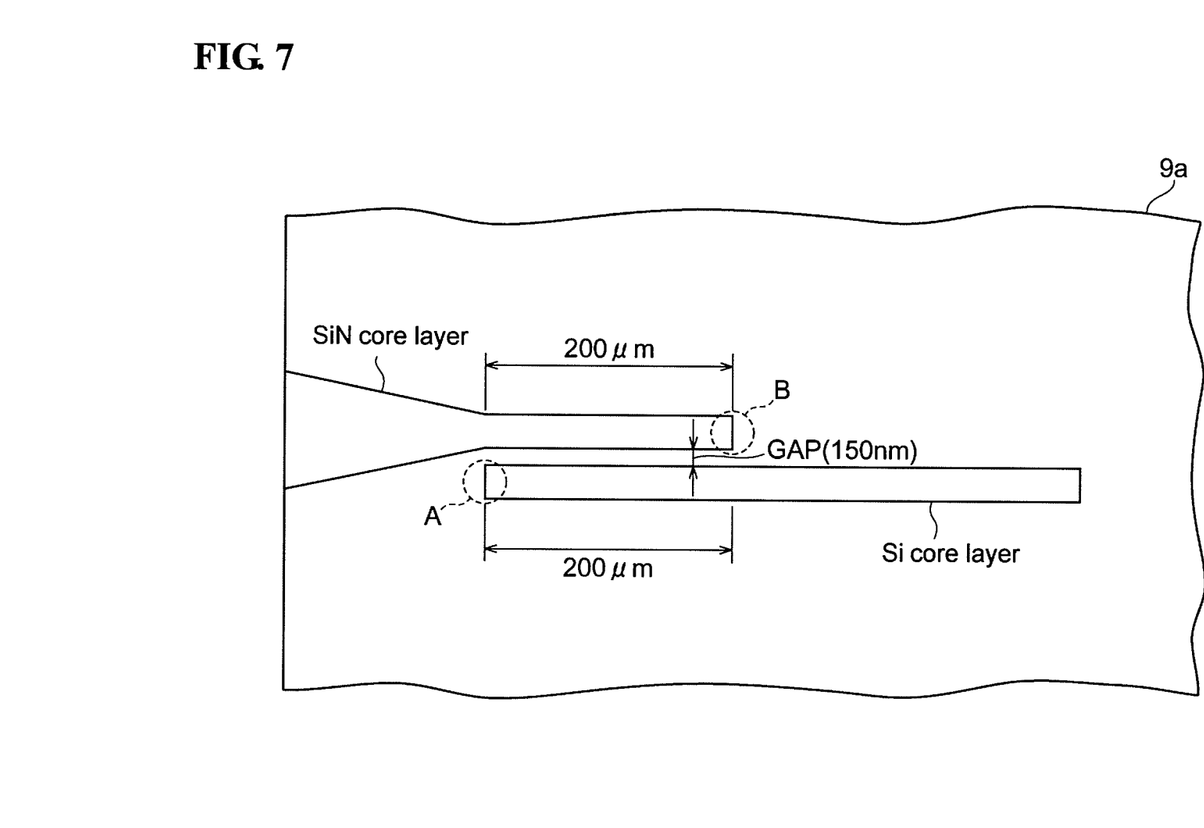
FIG. 7 schematically shows a spot-size converter of Comparative Example 2.

FIG. 7 shows a spot-size converter 9a. In the spot-size converter 9a, a tapered input/output portion in a SiN core layer composed of SiN is coupled to a waveguide portion having a constant width and one end of the waveguide portion is terminated. The waveguide portion having a constant width in the waveguide with SiN core layer has a length of, 200 μm, for example. In addition, a part of a propagation portion having a constant width in a Si core layer composed of Si and the waveguide portion of the SiN core layer are located side by side at a gap GAP of 150 nm, for example. One end of the propagation portion having a constant width is terminated. In the SiN core layer and the Si core layer located side by side, the width of the SiN core layer is the same as the width of the Si core layer. Therefore, the ratio of the width of the SiN core layer to the width of the Si core layer does not change. In this structure, a reflection of about 0.4 dB occurs at the terminal A of the Si core layer. A reflection of about 0.4 dB occurs at the terminal B of the SiN core layer. Such reflections caused at the terminals A and B of the Si core layer and the SiN core layer increase the optical loss of the spot-size converter. This decreases the coupling efficiency between the spot-size converter and a SMF.

COMPARATIVE EXAMPLE 3

Figure 8A:
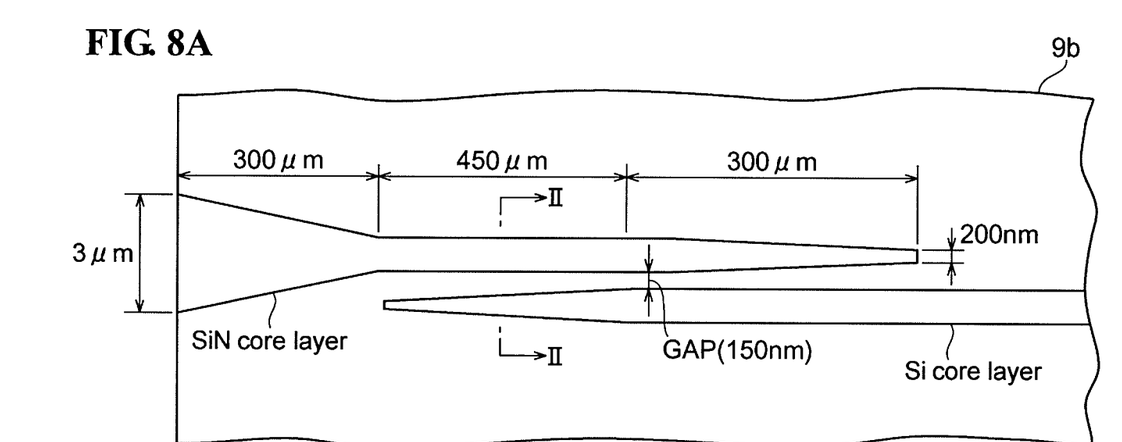
FIGS. 8A and 8B schematically show a spot-size converter of Comparative Example 3.
Figure 8B:
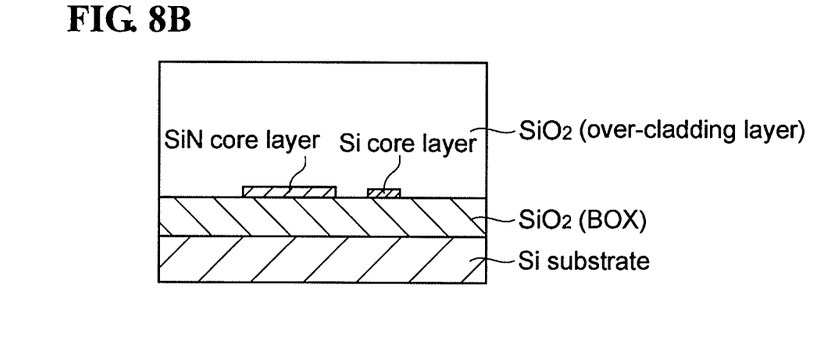

FIGS. 8A and 8B show a spot-size converter 9b. In the spot-size converter 9b, a SiN core layer composed of SiN has the same thickness as that of a Si core layer composed of Si. Therefore, light is weakly confined in the SiN core layer. As a result, the transition of light does not sufficiently occur from one of the Si core layer and the SiN core layer to the other. Such insufficient transition of light increases the radiation loss from an end of the Si core layer. Thus, the coupling efficiency between the spot-size converter 9b and a SMF is about 40%.

In the spot-size converters of the above-described embodiments, the SiN core layer has a larger thickness than the Si core layer. This can provide a spot-size converter having high coupling efficiency with a single-mode silica fiber (SMF). For example, when the first core layer 23 has a thickness of 1 μm or more in the spot-size converters 13a, 13b, and 13c, the coupling efficiency between each of the spot-size converters and a single-mode silica fiber (SMF) can be brought to be 60% or more.

COMPARATIVE EXAMPLE 4

Figure 9:
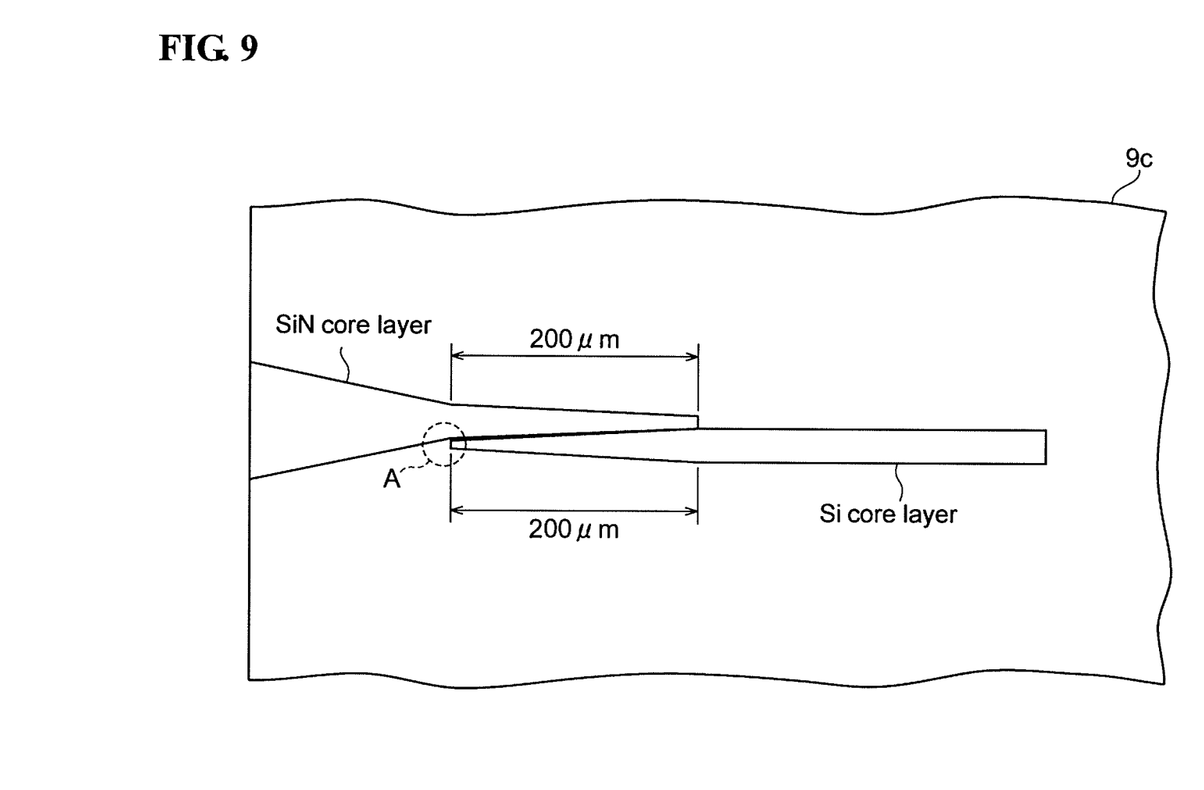
FIG. 9 schematically shows a spot-size converter of Comparative Example 4.

FIG. 9 shows a spot-size converter 9c. In the spot-size converter 9c, the gap between a Si core layer composed of Si and a SiN core layer composed of SiN is zero. That is, the Si core layer and the SiN core layer are in contact with each other. In this structure, the Si core layer and the SiN core layer is not separated by a cladding layer having a lower refractive index than the core layers. As a result, a waveguide including integrated cores is provided. The size of the tip of the Si core layer can only be decreased to about 180 nm because of the limit of lithography technique. Therefore, a reflection of about 0.5 dB occurs at the terminal (shown by circle A in FIG. 9) of the Si core layer.

In the spot-size converters 13a, 13b, and 13c, the Si core layer and the SiN core layer are separately provided. To achieve the optical separation between the Si core layer and the SiN core layer, a cladding layer having a refractive index lower than those of the core layers needs to be provided between the Si core layer and the SiN core layer.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A spot-size converter comprising:
a cladding layer having a principal surface defining a plane;
a first core layer disposed on the principal surface of the cladding layer, the first core layer having a light input/output portion and a first transition portion having a width W1 arranged along a first axis, the light input/output portion extending from an end of the spot-size converter and being coupled to the first transition portion, the light input/output portion having a width that monotonously decreases in a first direction from the light input/output portion toward the first transition portion;
a second core layer disposed on the principal surface of the cladding layer, the second core layer being composed of a material different from a material of the first core layer, the second core layer having a second transition portion extending along a second axis and a propagation portion coupled to the second transition portion, the second transition portion having a width W2, the second axis extending along the first axis; and
an over-cladding layer disposed on the principal surface of the cladding layer, and side surfaces and top surfaces of the first and second core layers, wherein
the first core layer has a refractive index between a refractive index of the second core layer and a refractive index of the cladding layer,
the first core layer and the second core layer are located adjacent to each other and separated from each other by a separation,
the plane of the principle surface or a plane parallel to the plane of the principle surface passes through each of the first core layer, the second core layer and the separation, and is substantially perpendicular to a third axis extending in a direction of thickness through the cladding layer, and the first and second core layers,
the first transition portion and the second transition portion have a gap therebetween,
the first transition portion is optically coupled to the second transition portion,
the first core layer has a thickness different from a thickness of the second core layer,
the over-cladding layer is disposed in the gap between the first transition portion and the second transition portion, and
a ratio (W1/W2) of the width W1 to the width W2 monotonously decreases in the first direction.

2. The spot-size converter according to claim 1, wherein the first core layer is terminated at a position away from the end of the spot-size converter, and
the second core layer is terminated at a position away from the end of the spot-size converter.

3. The spot-size converter according to claim 1, wherein the width W2 of the second transition portion monotonously increases in the first direction.

4. The spot-size converter according to claim 1, wherein the gap between the first transition portion and the second transition portion is 150 nm or more and 240 nm or less.

5. The spot-size converter according to claim 1, wherein the width W1 of the first transition portion monotonously decreases in the first direction.

6. The spot-size converter according to claim 1, wherein the width W1 of the first transition portion is constant in the first direction.

7. The spot-size converter according to claim 1, wherein the gap between the first transition portion and the second transition portion monotonously decreases in the first direction.

8. The spot-size converter according to claim 1, wherein the first core layer further has a first curved waveguide portion that is curved on the principal surface of the cladding layer,
the first core layer is terminated at a position away from the end of the spot-size converter,
the first curved waveguide portion is coupled to one end of the first transition portion, and
the light input/output portion is coupled to another end of the first transition portion.

9. The spot-size converter according to claim 8, wherein the second core layer further has a second curved waveguide portion that is curved on the principal surface of the cladding layer,
the second core layer is terminated at a position away from the end of the spot-size converter, the second curved waveguide portion is coupled to one end of the second transition portion, and
the propagation portion is coupled to another end of the second transition portion.

10. The spot-size converter according to claim 1, wherein the first core layer is composed of at least one of silicon nitride, silicon oxynitride, titanium oxide, and aluminum oxide,
the second core layer is composed of silicon, and
the thickness of the first core layer is larger than the thickness of the second core layer.

11. The spot-size converter according to claim 1, wherein the first core layer is composed of a polymer,
the polymer has a refractive index between the refractive index of the second core layer and the refractive index of the cladding layer,
the second core layer is composed of silicon, and
the thickness of the first core layer is larger than the thickness of the second core layer.

12. The sprit-size converter according to claim 11, wherein the polymer constituting the first core layer contains a benzocyclobutene resin, a polyimide resin, or an epoxy resin.

13. The spot-size converter according to claim 1, wherein the cladding layer is composed of silicon oxide.

14. The spot-size converter according to claim 1, wherein the first transition portion of the first core layer and the propagation portion of the second core layer are disposed approximately in parallel with each other.

15. The spot-size converter according to claim 1, wherein each of the first core layer and the second core layer are disposed directly on the cladding layer principle surface.

16. The spot-size converter according to claim 1, wherein the over-cladding layer has a refractive index, and
adjusting the refractive index of the over-cladding layer controls a ratio of optical coupling between the first transition portion of the first core layer and the second transition portion of the second core layer.

17. The spot-size converter according to claim 16, wherein the over-cladding layer is silicon dioxide ($SiO_2$).

18. The spot-size converter according to claim 17, wherein the over-cladding layer has a thickness about 5 µm.

* * * * *